US012687381B2

(12) United States Patent
Matsumoto

(10) Patent No.: US 12,687,381 B2
(45) Date of Patent: Jul. 21, 2026

(54) DETECTION DEVICE AND DETECTION METHOD

(71) Applicant: TOKYO ELECTRON LIMITED, Tokyo (JP)

(72) Inventor: Wataru Matsumoto, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 387 days.

(21) Appl. No.: 18/457,021

(22) Filed: Aug. 28, 2023

(65) Prior Publication Data

US 2024/0077298 A1 Mar. 7, 2024

(30) Foreign Application Priority Data

Sep. 2, 2022 (JP) ................................. 2022-140303

(51) Int. Cl.
*G01B 7/16* (2006.01)

(52) U.S. Cl.
CPC *G01B 7/16* (2013.01); *G01B 7/18* (2013.01)

(58) Field of Classification Search
CPC ....... G01B 7/16; G01B 7/18; H01L 21/67288; H01L 21/67126; H01L 21/6719; H01L 21/67742; H01L 21/67766; H01L 21/6838; H01L 21/68707
USPC .......................................................... 73/760
See application file for complete search history.

(56) References Cited

U.S. PATENT DOCUMENTS

2018/0328708 A1* 11/2018 Okumiya .............. G01L 1/2287
2020/0309617 A1* 10/2020 Mukai ................... G01L 1/2262
2022/0037125 A1 2/2022 Sasaki et al.
2022/0065716 A1* 3/2022 Shmilovich ............. G01B 7/18

FOREIGN PATENT DOCUMENTS

JP 2007-078514 A 3/2007
JP 2022-028447 A 2/2022
KR 10-1998-0043749 A 9/1998
KR 10-2010-0064346 A 6/2010

OTHER PUBLICATIONS

Suzuki, Y. et al. "Strain Measurement Using Carbon-Nanotube Embedded Resin." The 25th Japan Institute of Electronics Packaging Spring Meeting, Mar. 2011, pp. 353-354.

* cited by examiner

*Primary Examiner* — Peter J Macchiarolo
*Assistant Examiner* — John M Royston
(74) *Attorney, Agent, or Firm* — Fenwick & West LLP

(57) ABSTRACT

A detection device according to one embodiment of the present disclosure includes an elastic member, a measuring part and a detection part. The elastic member is disposed between a first member and a second member at a bonding portion where the first member and the second member are bonded and the elastic member is configured to be elastically deformable. The measuring part is configured to measure electrical characteristics at multiple locations of the elastic member. The detecting part is configured to detect deformation of the elastic member based on the electrical characteristics measured at the multiple locations by the measuring part.

13 Claims, 7 Drawing Sheets

DETECTION DEVICE AND DETECTION METHOD

CROSS-REFERENCE TO RELATED APPLICATIONS

This application claims priority to Japanese Patent Application No. 2022-140303, filed on Sep. 2, 2022, the entire contents of which are incorporated herein by reference.

TECHNICAL FIELD

The present disclosure relates to a detection device and a detection method.

BACKGROUND

Japanese Laid-open Patent Publication No. 2022-28447 discloses "a substrate processing device including a chamber, a shield member, and a relay member." The chamber has a processing room in which a substrate is processed with an introduced gas, and an exhaust room into which the gas in the processing room is exhausted. The shield member is disposed at least in a part near a sidewall of the chamber so as to separate the processing room from the exhaust room. Further, the shield member has a hole, in a portion of a wall parallel to the sidewall of the chamber, for connecting the processing room and the exhaust room, and can be driven in a vertical direction. The relay member is a hollow relay member that is connected to a pipe connected to an instrument outside the chamber, and can be driven in a horizontal direction. Further, the relay member is driven in a center direction of the chamber when the shield member reaches an upper end to connect an end of the center direction side to the shield member while causing the processing room and the pipe to communicate with each other through the hole.

In addition, Yusuke Suzuki et al., "Strain Measurement using carbon-nanotube embedded resin", the 25th Japan Institute of Electronics Packaging Spring Meeting, p. 353-354, March 2011, Japan Institute of Electronics Packaging (hereinafter, referred to as "Non-Patent Document 1"), discloses that "It was demonstrated that a highly sensitive strain sensor can be realized by embedding carbon nanotubes (CNT) in resin".

SUMMARY

The present disclosure provides a technique for detecting deformation of an elastic member.

A detection device according to one embodiment of the present disclosure includes an elastic member, a measuring part and a detection part. The elastic member is disposed between a first member and a second member at a bonding portion where the first member and the second member are bonded and the elastic member is configured to be elastically deformable. The measuring part is configured to measure electrical characteristics at multiple locations of the elastic member. The detecting part is configured to detect deformation of the elastic member based on the electrical characteristics measured at the multiple locations by the measuring part.

DETAILED DESCRIPTION

Hereinafter, embodiments of a detection device and a detection method disclosed of the present disclosure will be described in detail with reference to the accompanying drawings. Further, the following embodiments are not intended to limit the detection device and the detection method of the present disclosure.

Parts and devices that require airtightness are bonded via an elastic member such as an O-ring or the like. In the case of bonding members via an elastic member, it is necessary to apply a certain external force to the elastic member because the elastic member is deformed and functions as a gas seal on the surface of the member. The external force needs to be applied perpendicularly and uniformly to the elastic member. If an external force is incorrectly applied to the elastic member, the elastic member does not function as a gas seal, which may cause leakage, damage due to abnormal deformation, misalignment, or the like.

However, it is difficult to observe the elastic member embedded between the members from the outside, except when the member is made of a transparent material, and it is also difficult to detect a deformation state.

Therefore, a technique for detecting deformation of an elastic member is expected.

Embodiments

[Device Configuration]

Next, embodiments will be described. In the following description, an example of parts and devices that require airtightness will be described using a substrate processing apparatus. The substrate processing apparatus transfers a substrate such as a semiconductor wafer or the like, and performs substrate processing. In the following description, a case where the substrate processing apparatus performs film formation as substrate processing will be described as an example.

Figure 1:
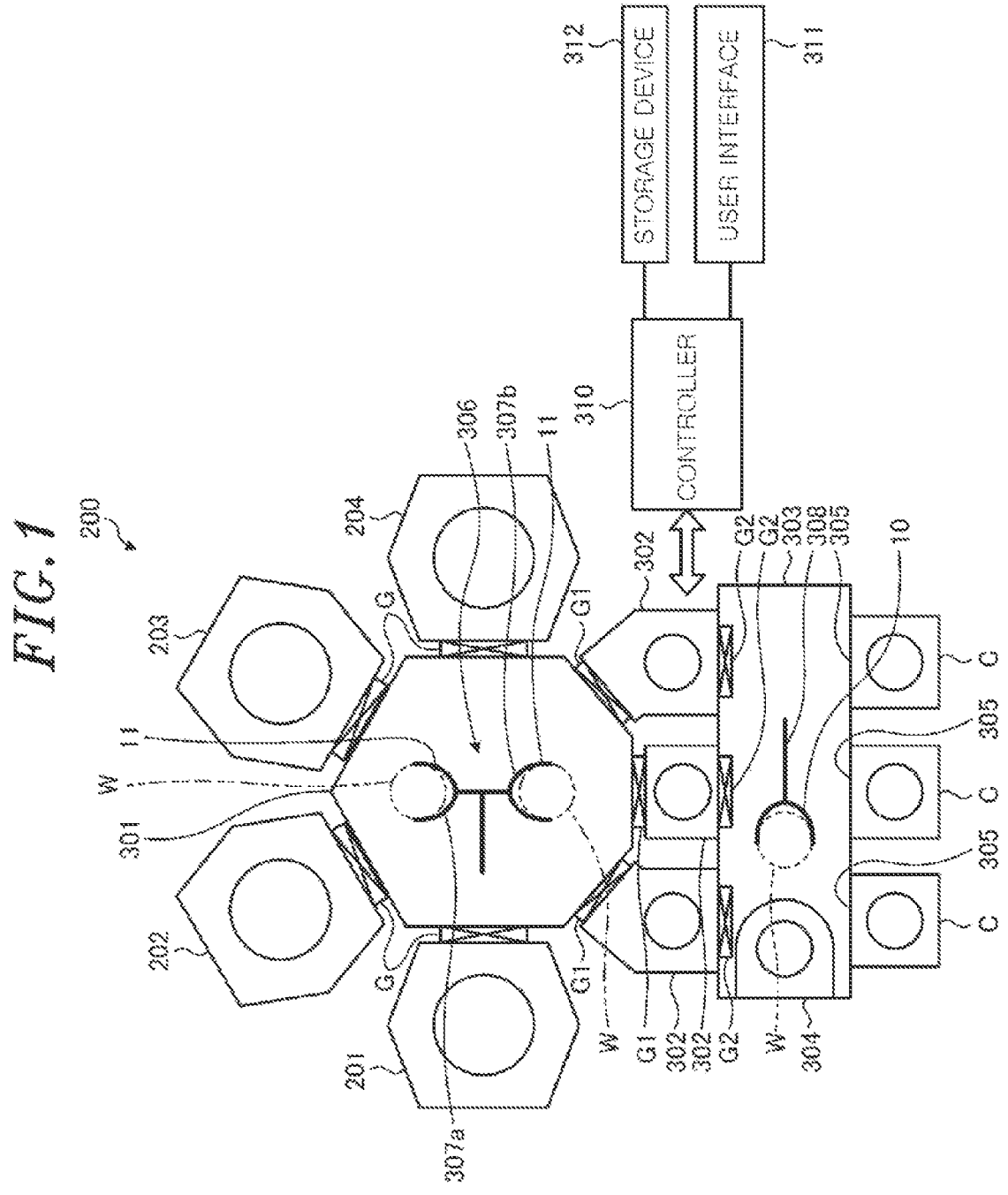
FIG. 1 is a configuration diagram schematically showing an example of a configuration of a substrate processing apparatus according to an embodiment.

FIG. 1 is a configuration diagram schematically showing an example of a configuration of a substrate processing apparatus 200 according to an embodiment. As shown in FIG. 1, the substrate processing apparatus 200 includes four process modules 201 to 204. Each of the process modules 201 to 204 has a chamber. Each chamber is evacuated to a predetermined vacuum level by a vacuum pump. Each of the process modules 201 to 204 is configured to be able to process a substrate in the chamber. For example, the process modules 201 to 204 are configured to be able to perform film formation in the chamber.

The process modules 201 to 204 are respectively connected to four walls of a vacuum transfer chamber 301 having a heptagonal planar shape through gate valves G. The vacuum transfer chamber 301 is evacuated to a predetermined vacuum level by a vacuum pump. Three load-lock chambers 302 are connected to the other three walls of the vacuum transfer chamber 301 through gate valves G1. An atmospheric transfer chamber 303 is disposed on the opposite side of the vacuum transfer chamber 301 with the load-lock chambers 302 interposed therebetween. The three load-lock chambers 302 are connected to the atmospheric transfer chamber 303 through gate valves G2. The load-lock chambers 302 control a pressure between an atmospheric pressure and a vacuum state at the time of transferring a substrate W between the atmospheric transfer chamber 303 and the vacuum transfer chamber 301.

Three carrier mounting ports 305 on which carriers (FOUP or the like) C containing substrates W are disposed on a wall of the atmospheric transfer chamber 303 opposite to the wall to which the load-lock chambers 302 is attached. Further, an alignment module 304 for aligning the substrate W is disposed in the atmospheric transfer chamber 303. A downflow of clean air is formed in the atmospheric transfer chamber 303.

A transfer mechanism 306 is disposed in the vacuum transfer chamber 301. The transfer mechanism 306 is configured as an articulated arm. The transfer mechanism 306 has two transfer arms 307a and 307b capable of moving independently. The transfer mechanism 306 has an end effector 11 capable of supporting the substrate W on the tip ends of the transfer arms 307a and 307b. The substrate W is placed on the end effector 11. The transfer mechanism 306 transfers the substrate W to and from the process modules 201 to 204 and the load-lock chambers 302.

A transfer mechanism 308 is disposed in the atmosphere transfer chamber 303. The transfer mechanism 308 is configured as an articulated arm. The transfer mechanism 308 has an end effector 10 capable of supporting the substrate W on the tip end thereof. The transfer mechanism 308 is configured to transfer the substrate W to and from the carriers C, the load-lock chambers 302, and the alignment module 304.

The substrate processing apparatus 200 has a controller 310. The overall operation of the substrate processing apparatus 200 is controlled by the controller 310. A user interface 311 and a storage device 312 are connected to the controller 310.

The user interface 311 includes an operation part such as a keyboard for allowing a process manager to input commands in order to manage the substrate processing apparatus 200, and a display part such as a display for visualizing and displaying an operating status of the substrate processing apparatus 200. The user interface 311 receives various operations. For example, the user interface 311 receives a predetermined operation for instructing start or stop of substrate processing.

The storage device 312 stores programs (software) for realizing various processes to be executed in the substrate processing apparatus 200 under the control of the controller 310, data such as processing conditions, process parameters, and the like. The program or the data may be stored in a computer-readable recording medium (for example, a hard disk, CD, a flexible disk, a semiconductor memory, or the like). Alternatively, the program or the data may be transmitted from another device through a dedicated line, for example, and used online.

The controller 310 is, for example, a computer including a processor, a memory, and the like. The controller 310 reads the program or the data from the storage device 312 based on instructions from the user interface 311, and controls individual components of the substrate processing apparatus 200 to transfer the substrate W to the process modules 201 to 204 and perform substrate processing on the substrate W.

Figure 2:
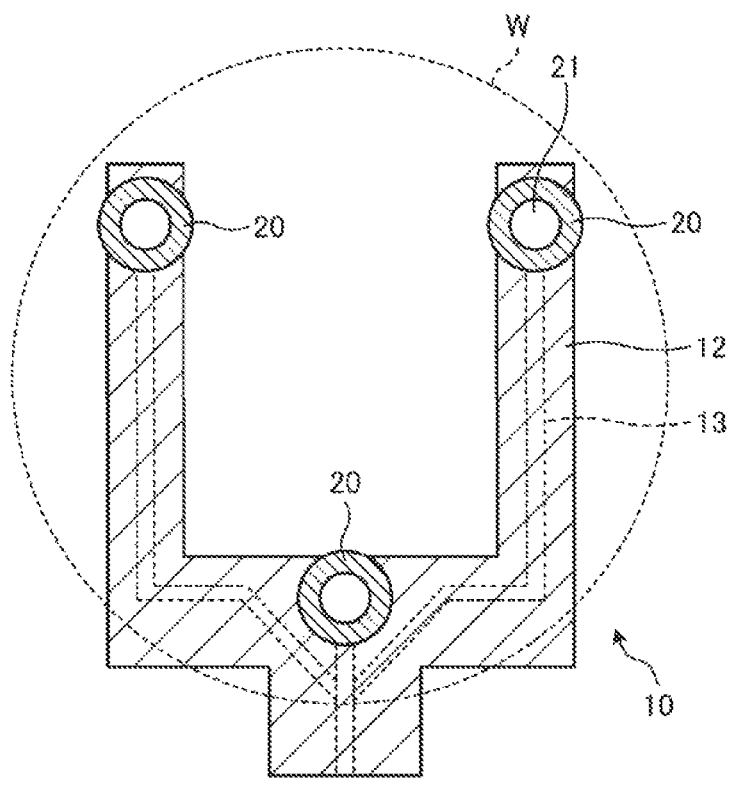
FIG. 2 is a plan view schematically showing an example of a configuration of an end effector according to an embodiment.

Next, an example of a configuration of the end effector of the transfer mechanism 308 will be described. FIG. 2 is a plan view schematically showing an example of the end effector 10 according to an embodiment.

The end effector 10 has a flat shape, and has an upper surface serving as a placing surface 12 on which the substrate W is placed. The end effector 10 transfers the substrate W while holding the substrate W on the placing surface 12 side. The end effector 10 forms an arm disposed at the tip end of the transfer mechanism 308. The end effector 10 is made of ceramic. The end effector 10 is branched into two parts on the tip end side thereof. The end effector 10 has three pads disposed at two branched tip ends and one base portion.

The pads 20 are made of elastic resin, and thus are elastically deformable. The resin is preferably polyimide or polyetheretherketone (PEEK) that is elastic and has a high heat resistance to hold a high-temperature substrate W. The resin may be a non-conductive material such as polyimide, or may be a conductive material. If charges are accumulated in the pads 20, the devices on the substrate W may be damaged when the pads 20 are brought into contact with the substrate W. Therefore, in the case where the charges are accumulated in the pads 20, the pads 20 are preferably made of a conductive material.

Each pad 20 is formed in an annular shape, and has a suction port 21 at the center thereof. The transfer mechanism 308 has therein a suction passage 13 that reach the pads 20. In FIG. 2, the suction passage 13 formed in the end effector is indicated by dashed lines. The suction passage 13 communicates with the suction ports 21. The suction passage 13 is connected to and evacuated by an exhaust device (not shown).

Figure 3:
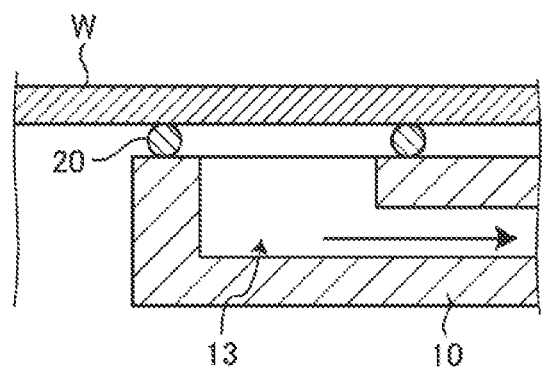
FIG. 3 is a cross-sectional view schematically showing an example of a configuration of a pad portion of the end effector according to the embodiment.

FIG. 3 is a cross-sectional view schematically showing an example of a configuration of the pad 20 disposed at the end effector 10 according to an embodiment. FIG. 3 shows a cross section of one pad 20 of the end effector 10. The substrate W is placed on the pads 20 of the end effector 10.

The suction ports 21 of the pads 20 communicate with the suction passage 13. The pads 20 attract the substrate W by conducting suction from the suction ports 21 when the suction passage 13 is evacuated by the exhaust device. Since the pads attract the substrate W, the pads 20 are deformed by an external force applied from the substrate W and brought into close contact with the backside of the substrate W, and function as a gas seal. The pads 20 airtightly separate the space formed by the suction ports 21 and the suction passage 13 from the space outside the pads 20.

The end effector 10 holds the substrate W by bringing the pads 20 into close contact with the backside the substrate W and locally vacuum-attracting the substrate W by the space surrounded by the pads 20 and the substrate W. The end effector 10 can strongly hold the substrate W by vacuum-attracting the substrate W with the pads 20, which makes it possible to stably transfer the substrate W.

In the substrate processing apparatus 200, parts and devices that require airtightness are used. For example, in the process modules 201 to 204, the vacuum transfer chamber 301, and the load-lock chambers 302 of the substrate processing apparatus 200, containers that require airtightness are used in order to maintain a vacuum state therein. For example, in the process modules 201 to 204, chambers are used as containers that require airtightness. Further, in the substrate processing apparatus 200, a container that requires airtightness is used to prevent particles from entering the atmosphere transfer chamber 303 from the outside. Moreover, since the end effector 10 requires airtightness to attract the substrate W, the pads 20 are used.

In parts and devices that require airtightness, members are bonded via an elastic member. For example, in a container such as a chamber that requires airtightness, members are bonded via an elastic member. Further, the end effector 10 attracts and holds the substrate W via the pads 20 because airtightness is required to attract the substrate W.

Figure 4:
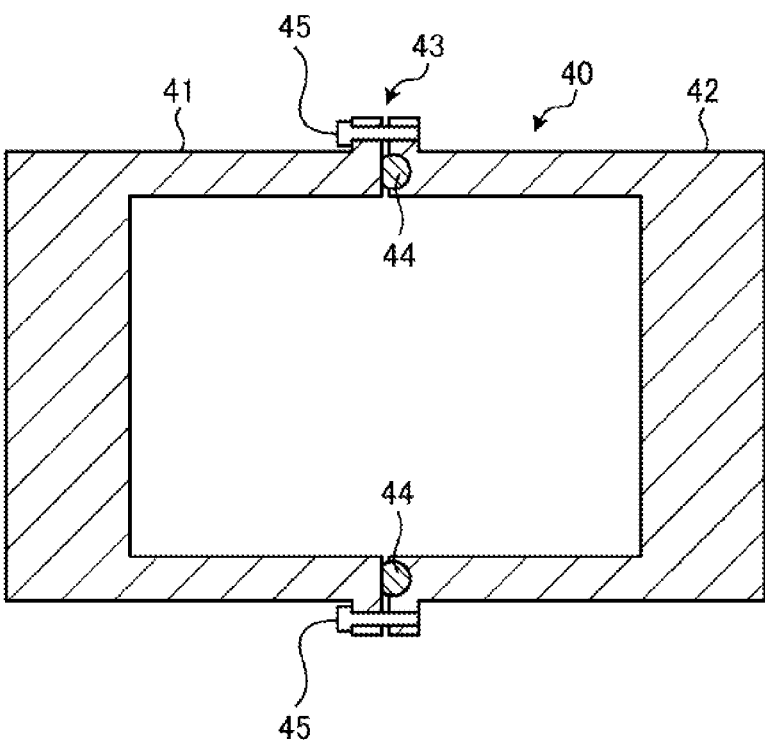
FIG. 4 schematically shows an example of a container that requires airtightness according to an embodiment.

FIG. 4 schematically shows an example of a container 40 that requires airtightness according to an embodiment. For example, the chambers of the process modules 201 to 204, or containers used in the vacuum transfer chamber 301, the load-lock chambers 302, the atmospheric transfer chamber 303, and the like, are schematically illustrated as the container 40.

The container 40 is formed by bonding a first member 41 and a second member 42. In the container 40, an O-ring 44 is disposed at bonding portions 43 where the first member 41 and the second member 42 are bonded. The O-ring 44 is disposed along the bonding portions 43, and is disposed between the first member 41 and the second member 42. The O-ring 44 is made of an annular elastic resin, and is elastically deformable. The container 40 is formed by fastening the first member 41 and the second member 42 with screws 45 or the like in a state where the O-ring 44 is disposed on the bonding surface where the first member 41 and the second member 42 are bonded. When the first member 41 and the second member 42 are fastened by the screws 45 or the like, the O-ring 44 is deformed by an external force and brought into close contact with the first member 41 and the second member 42, and functions as a gas seal. The first member 41 and the second member 42 are bonded, thereby forming a boundary between the space inside the container 40 and the space outside the container 40. The O-ring 44 airtightly separates the space inside the container 40 and the space outside the container 40.

In the case where members are bonded via an elastic member such as the pads 20, the O-ring 44, or the like, a certain external force needs to be applied to the elastic member so that the elastic member is deformed and functions as a gas seal on the member surfaces. For example, in FIG. 3, the weight of the substrate W due to its mass, and the force for sucking the substrate W by vacuum attraction correspond to the external force applied to the pads 20. For example, in FIG. 4, the force generated by the fastening using the screws 45 or the like corresponds to the external force applied to the O-ring 44. The external force needs to be applied perpendicularly and uniformly to the elastic member. If an external force is incorrectly applied to the elastic member, the elastic member does not function as a gas seal, which may cause leakage, damage due to abnormal deformation, misalignment, or the like. For example, in FIG. 3, if an external force is applied to the pads 20 in a shifted manner, a gap is generated because some of the pads 20 are not brought into close contact with the backside of the substrate W. Accordingly, the substrate W is not vacuumattracted, and the substrate W is held abnormally. For example, in FIG. 4, if an external force is applied to the O-ring 44 in a shifted manner, a gap may be generated because a part of the O-ring 44 is not brought into close contact with the backside of the substrate W, or leakage may occur due to abnormal deformation of the O-ring 44, misalignment, or the like.

The electrical characteristics of the elastic member such as the pads 20, the O-ring 44, or the like change due to deformation. The elastic member may be made of any material and may have any configuration as long as the change in the electrical characteristics due to deformation can be measured. For example, depending on materials contained in the resin, the change in the electrical characteristics of the elastic member due to deformation increases. Non-Patent Document 1 discloses that a thin film formed by dispersing carbon nanotubes in a resin has an electrical resistance that changes considerably due to deformation. Therefore, the elastic member may be made of a resin containing carbon nanotubes. For example, the pads 20 or the O-ring 44 may be formed by mixing carbon nanotubes in a resin and molding them.

Since the elastic member is made of a resin having a conductive portion, the change in electrical characteristics due to deformation increases. Therefore, the elastic member may be made of a resin having a conductive portion. For example, the elastic member may be formed by forming a circuit corresponding to a strain gauge in the resin using a 3D printer so that the resistance value of the elastic member may change due to deformation. Further, for example, the elastic member may be formed by laminating resins using a 3D printer and embedding a metal serving as a strain gauge in the resins during the lamination of the resins so that the resistance value of the elastic member may change due to deformation. Further, for example, the elastic member may be formed by processing a conductive resin into a fabric form. Since the contact area of the fabric changes due to deformation, the resistance value of the elastic member may change due to deformation. Further, for example, the elastic member may be formed by printing a strain gauge on a surface thereof with metal ink so that the resistance value of the elastic member may change due to deformation. Further, for example, the elastic member may be formed by embedding a Cu thin film in a surface of a resin by photolithography and etching and using the Cu thin film as a strain sensor so that the resistance value of the elastic member may change due to deformation.

The electrical characteristics of the pads 20 and the O-ring 44 can be measured at multiple locations thereof. In the substrate processing apparatus 200, the electrical characteristics of the pads 20 and the O-ring 44 are measured at multiple locations, and the deformation of the pads 20 and the O-ring 44 is detected based on the electrical characteristics measured at the multiple locations. The substrate processing apparatus 200 functions as the detection device of the present disclosure.

Figure 5:
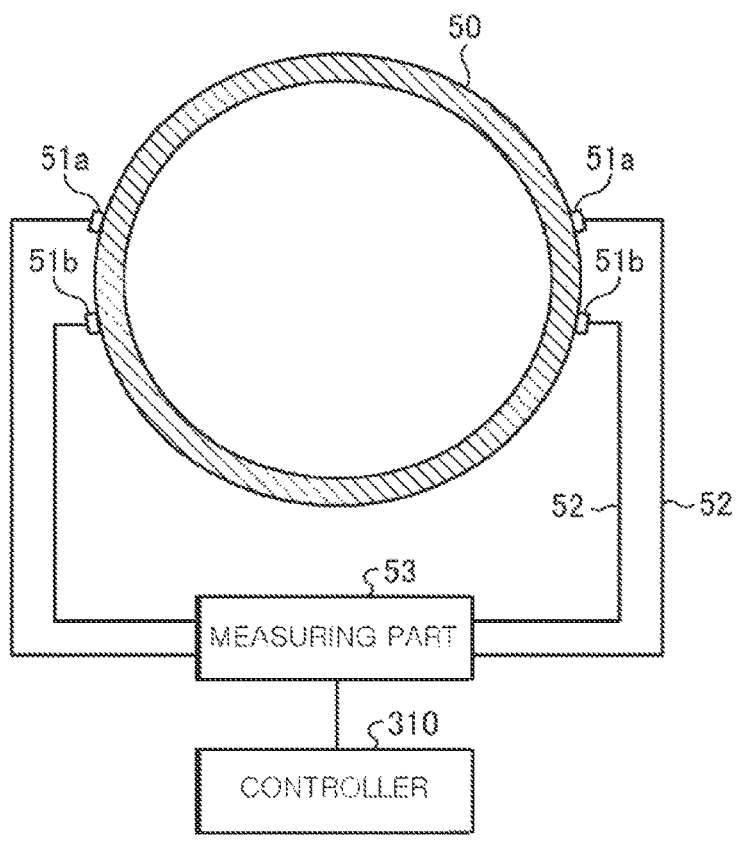
FIG. 5 explains an example of a configuration for measuring electrical characteristics of an elastic member according to an embodiment.

FIG. 5 explains an example of a configuration for measuring electrical characteristics of the elastic member 50 according to an embodiment. In FIG. 5, the O-ring 44 and the pads 20 are illustrated as the elastic member 50. The elastic member 50 is formed in an annular shape. The electrical characteristics of the elastic member 50 can be measured at multiple locations. For example, two electrodes are arranged at an interval at multiple locations along the circumferential direction of the elastic member 50. In FIG. 5, two sets of two electrodes 51*a* and 51*b* are respectively arranged at two symmetrical locations. Although FIG. 5 shows a case where the two sets of two electrodes 51*a* and 51*b* are respectively arranged at two locations of the elastic member 50, the electrodes may be arranged at three or more locations. The electrodes may be arranged at equal intervals, or may be concentrated at certain locations of the elastic member 50. The electrodes 51*a* and 51*b* may be fixed to the surface of the elastic member 50 by adhesion or the like, or may be embedded in the elastic member 50. The two electrodes 51*a* and 51*b* arranged at multiple locations are connected to a measuring part 53 through lines 52.

The measuring part 53 measures the electrical character-istics at multiple locations of the elastic member 50 through the lines 52. For example, the measuring part 53 applies a voltage to a gap between two electrodes arranged at multiple locations of the elastic member 50 to measure the resistance values between the two electrodes. In FIG. 5, the measuring part 53 measures the resistance value between the two electrodes 51*a* and 51*b* respectively arranged at two loca-tions of the elastic member 50. The measuring part 53 outputs data indicating the measured resistance values to the controller 310.

The controller 310 detects the deformation of the elastic member 50 based on the electrical characteristics measured at multiple locations by the measuring part 53. For example, data on the resistance values of the elastic member 50 measured at multiple locations by the measuring part 53 is inputted into the controller 310. In the controller 310, the deformation of the elastic member 50 is detected from the resistance values measured at multiple locations of the elastic member 50, which are indicated by the input data. In the embodiment, the controller 310 corresponds to the detection device of the present disclosure.

For example, the normal range of the resistance values measured at multiple locations of the elastic member 50 in a state where the elastic member 50 is deformed normally is specified in advance by a test, simulation, or the like. For example, when the elastic member 50 is the O-ring 44 shown in FIG. 4, the resistance values measured at multiple locations of the elastic member 50 in a state where the first member 41 and the second member 42 are normally bonded are obtained by a test or simulation. Then, the normal range of the resistance values measured at multiple locations is specified from the actual resistance values measured at multiple locations by a test, simulation, or the like. For example, the normal range of the resistance values measured at multiple locations is specified in consideration of a margin for the actual resistance values measured at multiple loca-tions. The controller 310 determines whether or not the resistance values measured at multiple locations of the elastic member 50 by the measuring part 53 is within the respective normal ranges. The controller 310 detects normal deformation of the elastic member 50 when the resistance values measured at the multiple locations of the elastic member 50 are within the respective normal ranges. On the other hand, the controller 310 detects abnormal deformation of the elastic member 50 when the resistance value is not within the normal range at any one of the multiple locations of the elastic member 50.

When the first member 41 and the second member 42 are normally bonded, an external force is substantially uni-formly applied to the elastic member 50 and, thus, the elastic member 50 is substantially uniformly deformed. In this case, for example, the controller 310 obtains the average value of the resistance values measured at multiple locations by the measuring part 53, and determines whether or not the resistance values measured at the multiple locations are within a predetermined allowable range from the average value. The allowable range is predetermined by a test, simulation, or the like. The controller 310 detects normal deformation of the elastic member 50 when the resistance values measured at multiple locations of the elastic member 50 are within the allowable range from the respective average values. On the other hand, the controller 310 detects abnormal deformation of the elastic member 50 when the resistance value measured at any one of the multiple loca-tions of the elastic member 50 is not within the allowable range from the average value.

The controller 310 outputs information based on the detection result. For example, the controller 310 outputs the information based on the detection result to an external device such as a management device capable of performing communication via a network (not shown). Further, the controller 310 outputs the information based on the detec-tion result to the user interface 311. For example, the controller 310 outputs warning of abnormal holding to the user interface 311 when abnormal deformation of the pad 20 is detected. Accordingly, for example, in FIG. 3, abnormal holding of the substrate W can be detected before the end effector 10 is moved, which makes it possible to suppress damage to the substrate W due to falling. Further, the controller 310 outputs warning to the user interface 311 when abnormal deformation of the elastic member 50 is detected. For example, when the controller 310 detects abnormal deformation of the O-ring 44, the controller 310 outputs warning of abnormal chamber bonding to the user interface 311. Accordingly, in FIG. 4, it is possible to determine whether or not the chambers can be normally bonded without checking leakage of the chamber by vacuum attraction.

In the above embodiments, the case of detecting defor-mation of the elastic member 50 has been described as an example. However, the present disclosure is not limited thereto. The controller 310 may detect bonding abnormality based on the electrical characteristics measured at multiple locations by the measuring part 53. For example, similar to the case of determining whether or not abnormal deforma-tion of the elastic member 50 has been detected, the con-troller 310 determines whether or not the resistance values measured at the multiple locations of the elastic member 50 are within the respective normal ranges, and may detect bonding abnormality when the resistance value measured at any one of the multiple locations is not within the normal range. Further, the controller 310 may obtain an average value of the resistance values measured at multiple locations of the elastic member 50, and may detect bonding abnor-mality when the resistance value measured at any of the multiple locations is not within the allowable range from the average value. The controller 310 may output warning to the user interface 311 or to an external device when bonding abnormality is detected.

Figure 6:
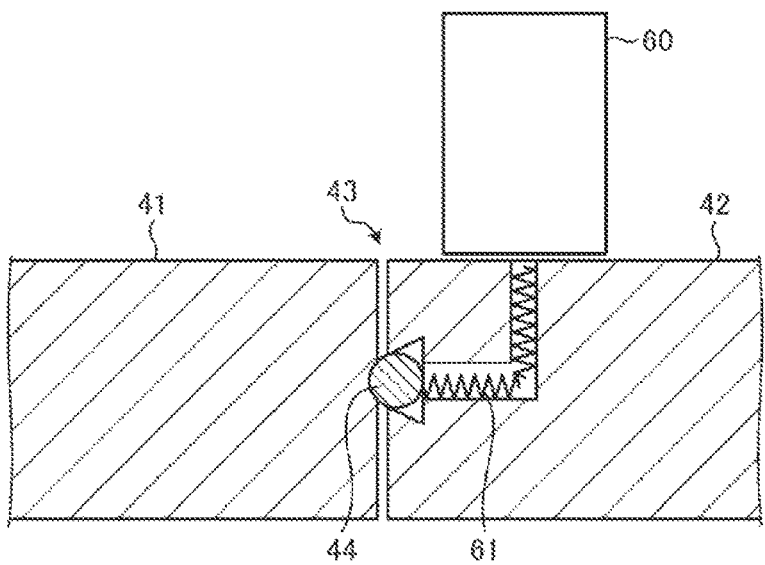
FIG. 6 schematically shows an example of a configuration for measuring a resistance value according to an embodiment.

Further, in the above embodiments, the case where the electrodes 51*a* and 51*b* are disposed at the elastic member 50 in order to measure the resistance value has been described as an example. However, the present disclosure is not limited thereto. The resistance value of the elastic member 50 may be measured by any method. In the case of irradi-ating microwaves to the elastic member 50 and measuring the reflection intensity of the microwaves, the resistance value and the reflection intensity of the microwaves are correlated. Therefore, the resistance value of the elastic member 50 may be measured using microwaves. FIG. 6 schematically show an example of a configuration for mea-suring a resistance value according to an embodiment. FIG. 6 shows a case of measuring a resistance value of the O-ring 44 using microwaves. The O-ring 44 is disposed along the bonding portions 43 where the first member 41 and the second member 42 are bonded. A measuring part 60 capable of transmitting and receiving microwaves is disposed at the second member 42. A transmission line 61 capable of transmitting microwaves from the measuring part 60 to the O-ring 44 is disposed at the second member 42. The measuring part 60 irradiates microwaves to the O-ring 44 through the transmission line 61 to detect the reflection intensity of the microwaves. The measuring part 60 measures the resistance value of the O-ring 44 from the detected reflection intensity based on the correlation information between the resistance value and the reflection intensity of the microwaves. The measuring part 60 outputs data indicating the measured resistance value to the controller 310. In the substrate processing apparatus 200 according to the embodiment, the configuration shown in FIG. 6 is provided at multiple locations along the bonding portions 43 to measure the resistance values at the multiple portions of the O-ring 44.

Further, in the above embodiments, the case of measuring the resistance value as the electrical characteristics has been described as an example. However, the present disclosure is not limited thereto. Other electrical characteristics may be measured as long as they change due to the deformation of the elastic member. For example, the electrical characteristics may be a current value, an impedance, a reactance, and the like. For example, the measuring part 53 may apply a predetermined voltage to a gap between the electrodes 51a and 51b disposed at multiple locations of the elastic member 50, and measure the values of current flowing between the electrodes 51a and 51b as the electrical characteristics. Further, for example, the measuring part 53 may apply an AC voltage to a gap between the electrodes 51a and 51b disposed at multiple locations of the elastic member 50, and measure impedances and reactances between the electrodes 51a and 51b as the electrical characteristics.

Further, in the above embodiments, the case where the technique of the present disclosure is applied to the chamber or the pads 20 of the end effector 10 has been described as an example. However, the present disclosure is not limited thereto. For example, the technique of the present disclosure may be applied to a seal for a rotation shaft.

Figure 7A:
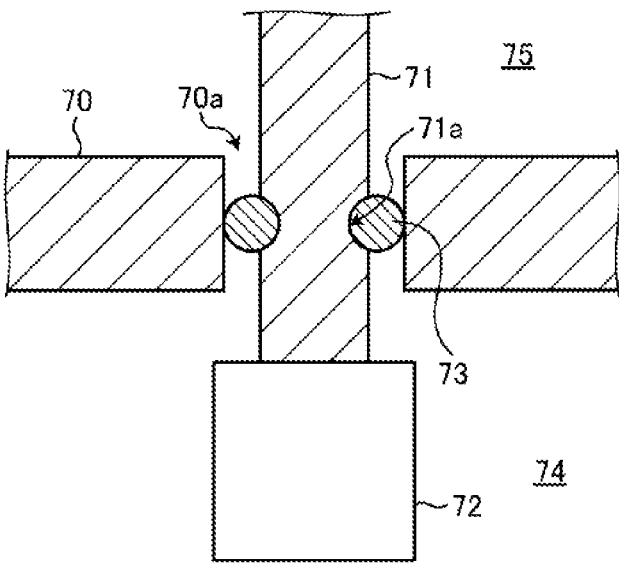
FIGS. 7A and 7B schematically show an example of a configuration for sealing a rotation shaft according to an embodiment.
Figure 7B:
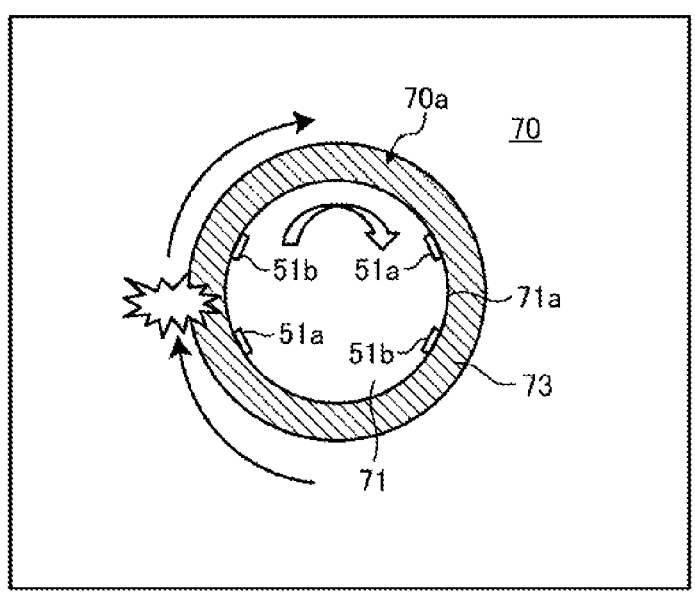

FIGS. 7A and 7B schematically show an example of a configuration for sealing a rotation shaft 71 according to an embodiment. FIG. 7A shows the configuration in cross-sectional view. FIG. 7B shows the configuration in plan view. A part of a housing 70 is shown in FIGS. 7A and 7B. As shown in FIG. 7A, the housing 70 serves as a boundary between a space 74 therebelow and a space 75 thereabove. The space 74 below the housing 70 is maintained at an atmospheric pressure. The space 75 above the housing 70 of the housing 70 is depressurized to a low pressure. A through-hole 70a is formed in the housing 70. The rotation shaft 71 penetrates through the through-hole 70a. The rotation shaft 71 is connected to a motor 72 and rotated by the driving force of the motor 72. A recess 71a is formed at a position corresponding to the through-hole 70a of the rotation shaft 71 along a circumferential direction. An O-ring 73 is disposed at the recess 71a of the rotation shaft 71. The O-ring 73 has an outer diameter slightly greater than that of the through-hole 70a, and fills the space between the rotation shaft 71 and the side surface of the through-hole 70a. The O-ring 73 is deformed while being embedded between the housing 70 and the rotation shaft 71, and functions as a gas seal for the rotation shaft 71. The O-ring 73 can airtightly separate the space 74 maintained at an atmospheric pressure and the space 75 maintained at a low pressure. FIG. 7B schematically shows a state in which the rotation shaft 71 is rotated. The rotation shaft 71 is rotated by the driving force of the motor 72. The O-ring 73 rotates together with the rotation shaft 71. The outer surface of the O-ring 73 slides on the side surface of the through-hole 70a. The O-ring 73 is covered with vacuum grease, and a lubricating surface is formed between the O-ring 73 and the side surface of the through-hole 70a. However, if abnormal friction occurs without normal lubrication due to deviation of the rotation shaft 71, deterioration of the O-ring 73, depletion of vacuum grease, or the like, the O-ring 73 is deformed non-uniformly in the circumferential direction. If the O-ring 73 is deformed non-uniformly, abnormality such as leakage or the like occurs. Therefore, the electrical characteristics of the O-ring 73 can be measured at multiple locations, and the deformation of the O-ring 73 is detected from the electrical characteristics measured at multiple locations of the O-ring 73. In the configuration of FIGS. 7A and 7B, O-ring 73 rotates with rotation shaft 71. Therefore, two electrodes are arranged at an interval at multiple locations along the circumferential direction of the recess 71a of the rotation shaft 71 so that the resistance values of the O-ring 73 can be measured at multiple locations. In FIG. 7B, the two sets of two electrodes 51a and 51b are respectively arranged at two symmetrical positions of the recess 71a of the rotation shaft 71 so that the resistance values can be measured at the two locations. The resistance value can be measured by providing a slip ring at the rotation shaft 71 and connecting wiring (not shown) connected to the two electrodes 51a and 51b arranged at multiple locations to the measuring part 53 via the slip ring. The measuring part 53 may be disposed at the rotation shaft 71. With this configuration, the deformation of the O-ring 73 can be detected.

Figure 8A:
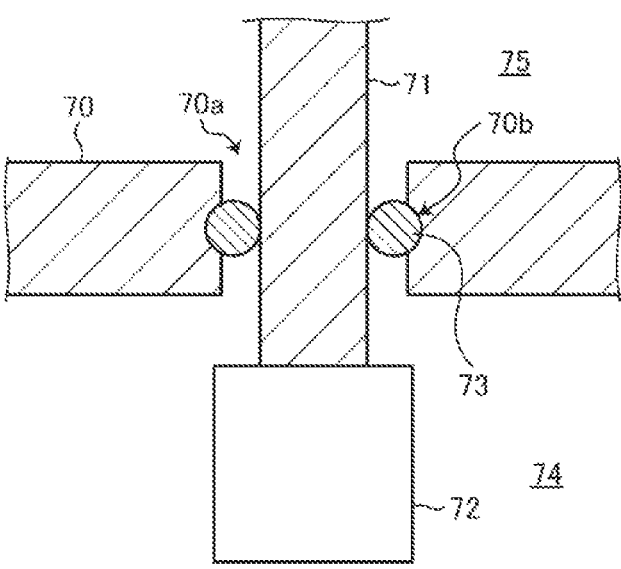
FIGS. 8A and 8B schematically show another example of the configuration for sealing the rotation shaft according to the embodiment.
Figure 8B:
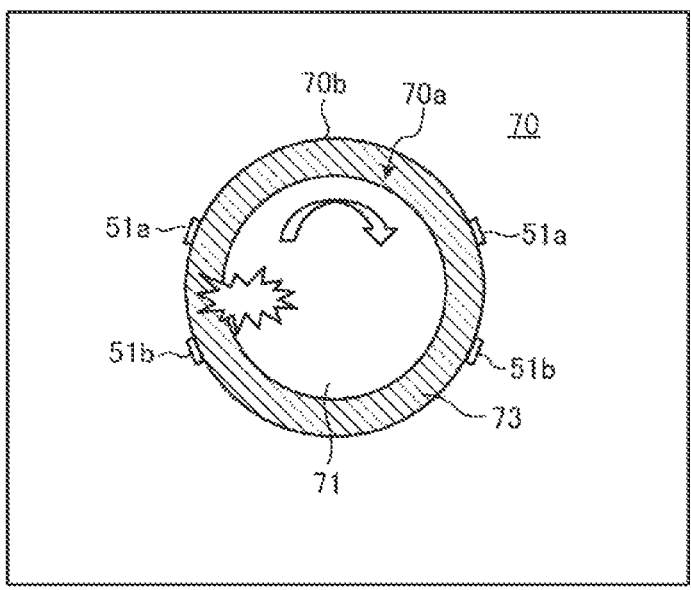

FIGS. 8A and 8B schematically show another example of the configuration for sealing the rotation shaft 71 according to the embodiment. FIG. 8A shows the configuration in cross-sectional view. FIG. 8B shows the configuration in plan view. The configuration of FIGS. 8A and 8B is partially the same as the configuration of FIGS. 7A and 7B. Hereinafter, the differences will be mainly described. The housing 70 has a recess 70b formed on the side surface of the through-hole 70a along the circumferential direction. The O-ring 73 is disposed in the recess 70b. The rotation shaft 71 penetrates through the hole of the O-ring 73. The O-ring 73 has an inner diameter slightly smaller than the diameter of the rotation shaft 71, and fills the space between the rotation shaft 71 and the side surface of the through-hole 70a. The O-ring 73 is deformed while being sandwiched between the housing 70 and the rotation shaft 71, and functions as a gas seal for the rotation shaft 71. FIG. 8B schematically shows a state in which the rotation shaft 71 is rotated. The rotation shaft 71 is rotated by the driving force of the motor 72. The O-ring 73 is fixed to the recess 70b of the housing 70. The side surface of the rotation shaft 71 slides on the inner side surface of the O-ring 73. The O-ring 73 is covered with vacuum grease, and a lubricating surface is formed between the O-ring 73 and the side surface of the rotation shaft 71. However, if abnormal friction occurs without normal lubrication due to deviation of the rotation shaft 71, deterioration of the O-ring 73, depletion of vacuum grease, or the like, the O-ring 73 is deformed non-uniformly in the circumferential direction. If the O-ring 73 is deformed non-uniformly, abnormality such as leakage or the like occurs. Therefore, the electrical characteristics of the O-ring 73 can be measured at multiple locations, and the deformation of the O-ring 73 is detected from the electrical characteristics measured at multiple locations of the O-ring 73. In the configuration of FIGS. 8A and 8B, O-ring 73 is fixed to the recess 70*b* of housing 70. Therefore, two electrodes are arranged at an interval at multiple locations along the circumferential direction of the recess 70*b* of the housing 70 so that the resistance values of the O-ring 73 can be measured at multiple locations. In FIG. 8B, the two sets of two electrodes 51*a* and 51*b* are respectively arranged at two symmetrical locations of the recess 70*b* of the housing 70 so that the resistance values can be measured at the two locations. The resistance value can be measured by connecting wiring (not shown) connected to the two electrodes 51*a* and 51*b* arranged at multiple locations to the measuring part 53. With this configuration, the deformation of the O-ring 73 can be detected.

Further, in the above embodiments, the case of detecting the deformation of the elastic member by applying the technique of the present disclosure to the substrate processing apparatus 200 has been described as an example. However, the present disclosure is not limited thereto. The technique of the present disclosure may be applied to any device as long as it has a configuration in which members are bonded via an elastic member.

Figure 9:
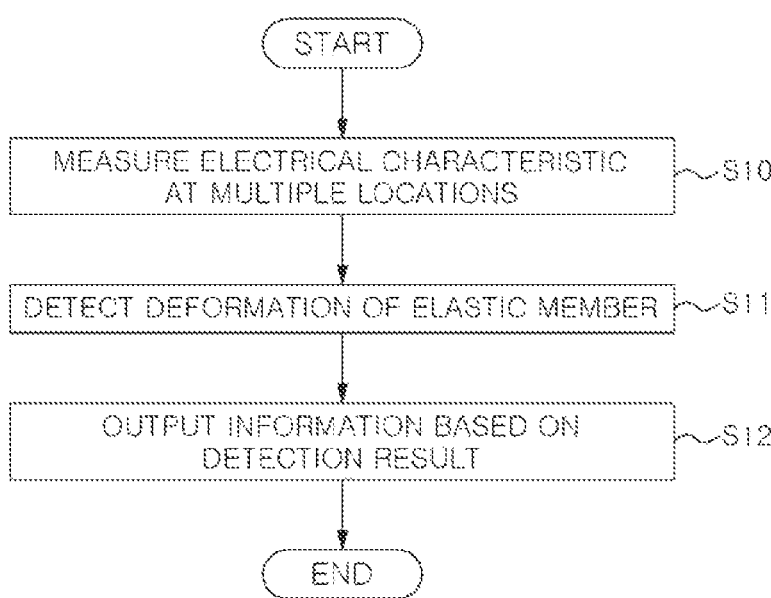
FIG. 9 is a flowchart showing an example of the flow of a detection process according to an embodiment.

Next, the flow of a detection process performed using the detection method according to the embodiment will be described. FIG. 9 is a flowchart illustrating an example of the flow of the detection process according to the embodiment. The process shown in FIG. 9 is executed, for example, at predetermined timing at which the detection of deformation of the elastic member 50 is required.

The measuring part 53 measures the electrical characteristics of the elastic member 50 at multiple locations (step S10). For example, the measuring part 53 applies a voltage to a gap between two electrodes arranged at multiple locations of the elastic member 50 to measure the resistance value between the two electrodes.

The controller 310 detects deformation of the elastic member 50 based on the electrical characteristics of the multiple points measured by the measuring part 53 (step S11). For example, the controller 310 determines whether or not the resistance values measured at multiple locations of the elastic member 50 are within the respective normal ranges. The controller 310 detects normal deformation of the elastic member 50 when the resistance values measured at the multiple points of the elastic member 50 are within the respective normal ranges. On the other hand, the controller 310 detects abnormal deformation of the elastic member 50 when the resistance value is not within the normal range at any one of the multiple locations of the elastic member 50.

The controller 310 outputs information based on the detection result (step S12), and ends the processing shown in the flowchart. For example, the controller 310 outputs information based on the detection result to an external device such as a management device capable of performing communication via a network (not shown). Further, the controller 310 outputs information based on the detection result to the user interface 311.

As described in the embodiments, the substrate processing apparatus 200 according to the embodiment includes the elastic member (for example, the pads 20, the O-ring 44, the elastic member 50, and the O-ring 73), the measuring part (for example, the measuring parts 53 and 60), and the detecting part (for example, the controller 310). The elastic member is disposed between the first member and the second member (for example, the substrate W and the end effector 10, the first member 41 and the second member 42, the housing 70 and the rotation shaft 71) at the bonding portions (for example, the bonding portions 43) where the first member and the second member are bonded. The elastic member is elastically deformable. The measuring part is configured to measure electrical characteristics at multiple locations of the elastic member. The detecting part is configured to detect deformation of the elastic member based on the electrical characteristics measured at the multiple locations by the measuring part. Accordingly, in the substrate processing apparatus 200, the deformation of the elastic member can be detected.

Further, the first member and the second member are bonded to form a boundary between the first space and the second space (for example, the space formed by the suction port 21 and the suction passage 13 and the space outside the pad(s) 20, the space inside the container 40 and the space outside the container 40, and the space 74 and the space 75). The elastic member is configured to airtightly separate the first space and the second space. Accordingly, in the substrate processing apparatus 200, the first space and the second space are divided while maintaining airtightness by the first member, the second member and the elastic member. Further, in the substrate processing apparatus 200, it is possible to detect the amount of deformation and the deformation state of the elastic member during bonding, and also possible to detect whether or not the deformation that causes leakage or breakage, in particular, has occurred.

Further, the elastic member is disposed along the bonding portion. The measuring part is configured to measure electrical characteristics at multiple locations along the bonding portions of the elastic member. Accordingly, in the substrate processing apparatus 200, the deformation of the elastic member disposed along the bonding portions can be detected.

Further, the measuring part is configured to measure the resistance values at multiple locations of the elastic member. The detecting part is configured to detect deformation of the elastic member based on the resistance values measured at multiple locations by the measuring part. Accordingly, in the substrate processing apparatus 200, the deformation of the elastic member can be detected.

Further, the detecting part is configured to detect whether or not the deformation of the elastic member is normal based on whether the resistance values measured at the multiple locations by the measuring part are within a predetermined normal range. Accordingly, in the substrate processing apparatus 200, it is possible to detect whether or not the deformation of the elastic member is normal.

Further, the detecting part is configured to obtain the average value of the resistance values measured at multiple locations by the measuring part, and determine whether or not the deformation of the elastic member is normal based on whether the resistance values measured at the multiple locations are within a predetermined allowable range from the average value. Accordingly, in the substrate processing apparatus 200, a state in which the elastic member is substantially uniformly deformed can be detected as a normal state.

Further, the detecting part is configured to detect bonding abnormality between the first member and the second member based on the electrical characteristics measured at multiple locations by the measuring part. Accordingly, in the substrate processing apparatus 200, the bonding abnormality between the first member and the second member can be detected.

Further, the elastic member is made of a resin having a conductive portion. Accordingly, in the substrate processing apparatus 200, the deformation of the elastic member can be detected with high sensitivity.

Further, the elastic member is made of a resin having carbon nanotubes. Accordingly, in the substrate processing apparatus 200, the deformation of the elastic member can be detected with high sensitivity.

Further, the first member and the second member are bonded to form a chamber. The elastic member serves as a seal for airtightly separating the space inside the chamber from the space outside the chamber. Accordingly, in the substrate processing apparatus 200, abnormality of the seal for the chamber can be detected.

The substrate W serves as the first member. The end effector 10 on which the substrate W is placed serves as the second member. The elastic member is disposed on the placing surface 12 of the end effector 10 on which the substrate W is placed, and is formed as the pads 20 having the suction ports 21 communicating with the suction passage 13 formed in the end effector 10. Accordingly, in the substrate processing apparatus 200, the deformation of the pads 20 disposed at the end effector 10 can be detected, and holding abnormality of the substrate W at the end effector 10 can be detected.

The housing 70 having the through-hole 70*a* serves as the first member. The rotation shaft 71 penetrating through the through-hole 70*a* serves as the second member. The elastic member is formed as a seal that fills the space between the rotation shaft 71 and the side surface of the through-hole 70*a*. Accordingly, in the substrate processing apparatus 200, abnormality of the seal for the rotation shaft can be detected.

Further, it should be noted that the embodiments of the present disclosure are illustrative in all respects and are not restrictive. The above-described embodiments can be embodied in various forms. Further, the above-described embodiments may be omitted, replaced, or changed in various forms without departing from the scope of the appended claims and the gist thereof.

Further, the following additional statements are disclosed with respect to the above embodiments.

APPENDIX 1

A detection device comprising:
an elastically deformable elastic member disposed between a first member and a second member at a bonding portion where the first member and the second member are bonded;
a measuring part configured to measure electrical characteristics at multiple locations of the elastic member; and
a detecting part configured to detect deformation of the elastic member based on the electrical characteristics measured at the multiple locations by the measuring part.

APPENDIX 2

The detection device of Appendix 1, wherein the first member and the second member are bonded to form a boundary between a first space and a second space, and the elastic member airtightly separates the first space and the second space.

APPENDIX 3

The detection device of Appendix 1 or 2, wherein the elastic member is disposed along the bonding portion, and the measuring part is configured to measure the electrical characteristics at the multiple locations of the elastic member along the bonding portion.

APPENDIX 4

The detection device of any one of Appendices 1 to 3, wherein the measuring part is configured to measure resistance values at the multiple locations of the elastic member, and the detecting part is configured to detect deformation of the elastic member based on the resistance values measured at the multiple locations by the measuring part.

APPENDIX 5

The detection device of Appendix 4, wherein the detecting part is configured to detect whether or not the deformation of the elastic member is normal based on whether or not the resistance values measured at the multiple locations by the measuring part are within a predetermined normal range.

APPENDIX 6

The detection device of Appendix 4, wherein the detecting part is configured to obtain an average value of the resistance values measured at the multiple locations by the measuring part, and detect whether or not the deformation of the elastic member is normal based on whether or not the resistance values measured at the multiple locations are within a predetermined allowable range from the average value.

APPENDIX 7

The detection device of any one of Appendices 1 to 6, wherein the detecting part is configured to detect bonding abnormality between the first member and the second member based on the electrical characteristics of the multiple locations measured by the measuring part.

APPENDIX 8

The detection device of any one of Appendices 1 to 7, wherein the elastic member is made of a resin having a conductive portion.

APPENDIX 9

The detection device of any one of Appendices 1 to 7, wherein the elastic member is made of a resin having carbon nanotubes.

APPENDIX 10

The detection device of any one of Appendices 1 to 9, wherein the first member and the second member are bonded to form a chamber, and the elastic member is formed as a seal that airtightly separates a space inside the chamber from a space outside the chamber.

APPENDIX 11

The detection device of any one of Appendices 1 to 9, wherein the first member is a substrate,
the second member is an end effector on which the substrate is placed, and the elastic member is disposed on a placing surface of the end effector on which the substrate is placed, and is formed as a pad having a suction port communicating with a suction passage formed in the end effector.

APPENDIX 12

The detection device of any one of Appendices 1 to 9, wherein the first member is a housing having a through-hole, the second member is a rotation shaft penetrating through the through-hole, and the elastic member is formed as a seal that fills a space between the rotation shaft and a side surface of the through-hole.

APPENDIX 13

A detection method comprising: measuring electrical characteristics at multiple locations of an elastically deformable elastic member disposed between a first member and a second member at a bonding portion where the first member and the second member are bonded; and detecting deformation of the elastic member based on electrical characteristics measured at the multiple locations.

The invention claimed is:

1. A detection device comprising: an elastically deformable elastic member disposed between a first member and a second member at a bonding portion where the first member and the second member are bonded; a measuring part configured to measure electrical characteristics at multiple locations of the elastic member; and a detecting part configured to detect deformation of the elastic member based on the electrical characteristics measured at the multiple locations by the measuring part, wherein the elastic member is configured to seal between the first member and the second member.

2. The detection device of claim 1, wherein the elastic member is disposed along the bonding portion, and the measuring part is configured to measure the electrical characteristics at the multiple locations of the elastic member along the bonding portion.

3. The detection device of claim 1, wherein the measuring part is configured to measure resistance values at the multiple locations of the elastic member, and the detecting part is configured to detect deformation of the elastic member based on the resistance values measured at the multiple locations by the measuring part.

4. The detection device of claim 3, wherein the detecting part is configured to detect whether or not the deformation of the elastic member is normal based on whether or not the resistance values measured at the multiple locations by the measuring part are within a predetermined normal range.

5. The detection device of claim 1, wherein the detecting part is configured to detect bonding abnormality between the first member and the second member based on the electrical characteristics of the multiple locations measured by the measuring part.

6. The detection device of claim 1, wherein the elastic member is made of a resin having a conductive portion.

7. The detection device of claim 1, wherein the elastic member is made of a resin having carbon nanotubes.

8. The detection device of claim 1, wherein the first member and the second member are bonded to form a chamber, and the elastic member is formed as a seal that airtightly separates a space inside the chamber from a space outside the chamber.

9. A detection device comprising: an elastically deformable elastic member disposed between a first member and a second member at a bonding portion where the first member and the second member are bonded; a measuring part configured to measure electrical characteristics at multiple locations of the elastic member; and a detecting part configured to detect deformation of the elastic member based on the electrical characteristics measured at the multiple locations by the measuring part, wherein the first member and the second member are bonded to form a boundary between a first space and a second space, and the elastic member airtightly separates the first space and the second space.

10. A detection device comprising: an elastically deformable elastic member disposed between a first member and a second member at a bonding portion where the first member and the second member are bonded; a measuring part configured to measure electrical characteristics at multiple locations of the elastic member; and a detecting part configured to detect deformation of the elastic member based on the electrical characteristics measured at the multiple locations by the measuring part, wherein the measuring part is configured to measure resistance values at the multiple locations of the elastic member, and the detecting part is configured to detect deformation of the elastic member based on the resistance values measured at the multiple locations by the measuring part, wherein the detecting part is configured to obtain an average value of the resistance values measured at the multiple locations by the measuring part, and detect whether or not the deformation of the elastic member is normal based on whether or not the resistance values measured at the multiple locations are within a predetermined allowable range from the average value.

11. A detection device comprising: an elastically deformable elastic member disposed between a first member and a second member at a bonding portion where the first member and the second member are bonded; a measuring part configured to measure electrical characteristics at multiple locations of the elastic member; and a detecting part configured to detect deformation of the elastic member based on the electrical characteristics measured at the multiple locations by the measuring part, wherein the first member is a substrate, the second member is an end effector on which the substrate is placed, and the elastic member is disposed on a placing surface of the end effector on which the substrate is placed, and is formed as a pad having a suction port communicating with a suction passage formed in the end effector.

12. A detection device comprising:

an elastically deformable elastic member disposed between a first member and a second member at a bonding portion where the first member and the second member are bonded;

a measuring part configured to measure electrical characteristics at multiple locations of the elastic member; and a detecting part configured to detect deformation of the elastic member based on the electrical characteristics measured at the multiple locations by the measuring part, wherein the first member is a housing having a through-hole, the second member is a rotation shaft penetrating through the through-hole, and the elastic member is formed as a seal that fills a space between the rotation shaft and a side surface of the through-hole.

13. A detection method comprising:

measuring electrical characteristics at multiple locations of an elastically deformable elastic member disposed between a first member and a second member at a bonding portion where the first member and the second member are bonded; and detecting deformation of the elastic member based on electrical characteristics measured at the multiple locations, and wherein the elastic member is configured to seal between the first member and the second member.

\* \* \* \* \*